(12) United States Patent
Puzzonia et al.

(10) Patent No.: US 8,979,129 B2
(45) Date of Patent: Mar. 17, 2015

(54) SEAT BELT RETRACTOR

(75) Inventors: John Pasquale Puzzonia, Macomb, MI (US); Michael Zdravkoski, Shelby Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/451,501

(22) Filed: Apr. 19, 2012

(65) Prior Publication Data

US 2012/0267885 A1 Oct. 25, 2012

Related U.S. Application Data

(60) Provisional application No. 61/478,329, filed on Apr. 22, 2011.

(51) Int. Cl.
*B60R 22/40* (2006.01)
*B60R 22/34* (2006.01)

(52) U.S. Cl.
CPC ......... *B60R 22/40* (2013.01); *B60R 2022/3402* (2013.01)
USPC ...... 280/806; 297/480; 242/382.2; 242/384.2

(58) Field of Classification Search
USPC .................. 280/806, 807; 297/478, 480, 470; 242/382, 383.4, 382.2, 384, 384.2, 242/379, 379.1, 390.8
See application file for complete search history.

(56) References Cited

U.S. PATENT DOCUMENTS

| 4,384,804 | A | * | 5/1983 | Cachia et al. | 403/345 |
|---|---|---|---|---|---|
| 4,844,374 | A | * | 7/1989 | Mori | 242/384.4 |
| 4,998,684 | A | * | 3/1991 | Mori | 242/384.5 |
| 5,209,421 | A | * | 5/1993 | Fujiwara et al. | 242/384.5 |
| 5,251,843 | A | | 10/1993 | Kielwein et al. | |
| 5,332,291 | A | * | 7/1994 | Fujimura et al. | 297/480 |
| 5,443,224 | A | * | 8/1995 | Patterson et al. | 242/384.2 |
| 6,082,655 | A | * | 7/2000 | Verellen et al. | 242/379 |
| 6,109,556 | A | * | 8/2000 | Kopetzky et al. | 242/382.2 |
| 6,164,581 | A | * | 12/2000 | Freeman et al. | 242/384.4 |
| 7,377,463 | B2 | | 5/2008 | Morgan et al. | |
| 7,455,256 | B2 | * | 11/2008 | Morgan | 242/384 |
| 7,686,339 | B2 | * | 3/2010 | Rogers | 280/805 |
| 2003/0205638 | A1 | * | 11/2003 | Wier | 242/383.4 |
| 2006/0267330 | A1 | * | 11/2006 | Inuzuka et al. | 280/806 |
| 2008/0054614 | A1 | * | 3/2008 | Drascher et al. | 280/752 |
| 2008/0203808 | A1 | | 8/2008 | Yoshioka et al. | |
| 2011/0133012 | A1 | * | 6/2011 | Mori | 242/384 |
| 2012/0126046 | A1 | * | 5/2012 | Wulff | 242/384 |

\* cited by examiner

*Primary Examiner* — Karen Beck
(74) *Attorney, Agent, or Firm* — Foley & Lardner LLP

(57) ABSTRACT

A retractor including a rotatable spool configured to be connected to a webbing, a locking member configured to selectively lock the spool and prevent the spool from rotating in the webbing extraction direction, a sensor, and a cover for the sensor and locking member. When the locking member is in a locked position, the spool is prohibited from rotating in the webbing extraction direction. The sensor is configured to move in a first direction in response to the vehicle having a threshold acceleration. Movement of the sensor in the first direction causes a corresponding movement of the locking member to a locked position. The sensor is located in a cavity in the cover and an insert member is disposed between the cover and the sensor to limit the travel of the sensor in a second direction transverse to the first direction.

19 Claims, 6 Drawing Sheets

SEAT BELT RETRACTOR

CROSS-REFERENCE TO RELATED PATENT APPLICATIONS

This application claims the benefit of and priority to U.S. Provisional Patent Application No. 61/478,329, filed on Apr. 22, 2011. U.S. Provisional Patent Application No. 61/478,329 is incorporated by reference herein in its entirety.

BACKGROUND

The present application relates generally to the field of seat belt retractors for use in seat belt systems for restraining secured occupants of a vehicle. More specifically, the present application relates to an apparatus for reducing the noise generated by a seat belt retractor.

SUMMARY

One embodiment relates to a retractor for a seat belt system of a vehicle. The retractor includes a rotatable spool configured to be connected to a webbing wherein the webbing moves in an extraction direction and a retraction direction upon rotation of the spool, a locking member configured to selectively lock the spool and prevent the spool from rotating in the webbing extraction direction, a sensor, and a cover for the sensor and locking member. The locking member is configured to move between a free position and a locked position relative to the spool. When the locking member is in the locked position, the spool is prohibited from rotating in the webbing extraction direction. When the locking member is in the free position, the spool is freely rotatable. The sensor is configured to move in a first direction in response to the vehicle having a threshold acceleration and wherein movement of the sensor in the first direction causes a corresponding movement of the locking member from the free position to the locked position. The sensor is located in a cavity in the cover and an insert member is disposed between the cover and the sensor to limit the travel of the sensor in a second direction that is transverse to the first direction.

Another embodiment relates to a seat belt system for a vehicle for restraining a secured occupant. The seat belt system includes a webbing having a first end and a second end, an anchor configured to secure the first end of the webbing, a tongue member slideably coupled to the webbing and configured to selectively engage a buckle mechanism, and a retractor. The retractor includes a rotatable spool configured to be connected to the second end of the webbing wherein the webbing moves in an extraction direction and a retraction direction upon rotation of the spool, a locking member configured to selectively lock the spool and prevent the spool from rotating in the webbing extraction direction, a sensor, and a cover for the sensor and locking member. The locking member is configured to move between a free position and a locked position relative to the spool. When the locking member is in the locked position, the spool is prohibited from rotating in the webbing extraction direction. When the locking member is in the free position, the spool is freely rotatable. The sensor is configured to move in a first direction in response to the vehicle having a threshold acceleration and wherein movement of the sensor in the first direction causes a corresponding movement of the locking member from the free position to the locked position. The sensor is located in a cavity in the cover and an insert member is disposed between the cover and the sensor to limit the travel of the sensor in a second direction that is transverse to the first direction.

Yet another embodiment relates to a retractor for a seat belt system of a vehicle. The retractor includes a rotatable spool configured to be connected to a webbing wherein the webbing moves in an extraction direction and a retraction direction upon rotation of the spool, a locking member configured to selectively lock the spool and prevent the spool from rotating in the webbing extraction direction, a sensor, and a cover defining a cavity for housing the sensor. The locking member is configured to move between a free position and a locked position relative to the spool. When the locking member is in the locked position, the spool is prohibited from rotating in the webbing extraction direction. When the locking member is in the free position, the spool is freely rotatable. The sensor is configured to move in a first direction in response to the vehicle having a threshold acceleration and wherein movement of the sensor in the first direction causes a corresponding movement of the locking member from the free position to the locked position. The cover includes an outer layer of structural material and an inner layer of elastomeric material formed over the outer layer to dampen a noise of contact between the sensor and the cover.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

With general reference to the Figures, disclosed herein are retractors for use in seat belt systems configured to include a sensing mechanism for detecting a vehicle acceleration to selectively lock a webbing from being extracted from the retractor. The sensing mechanism may be configured for use as a vehicle sensor (VS) having a sensor configured to detect a change in the inertia of the vehicle, whereby the sensor may activate a locking member (e.g., an actuator), which is configured to selectively lock the retractor, such as a gear of a spool of the retractor, when the sensor detects a threshold inertia, such as a threshold vehicle acceleration, which may be caused by a sudden stop in the vehicle or a high g-force turn through a sharp curve at relatively high speed. The term acceleration as used herein refers to the absolute value of the acceleration that the vehicle experiences, whether negative (e.g., deceleration) or positive. The sensing mechanism also includes a member (e.g., insert member) that is configured to reduce the noise of the retractor without impeding the performance of the locking of the retractor upon the threshold vehicle acceleration.

Figure 1:
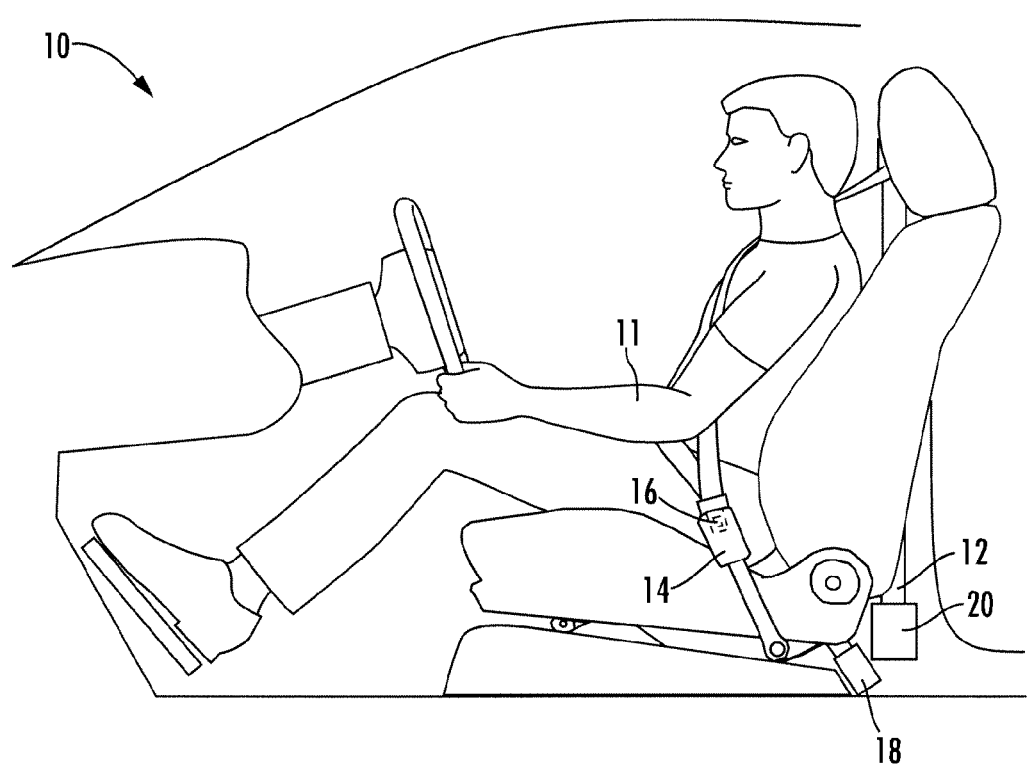
FIG. 1 is a schematic side view of a vehicle interior showing a seat belt assembly, according to an exemplary embodiment.
Figure 2:
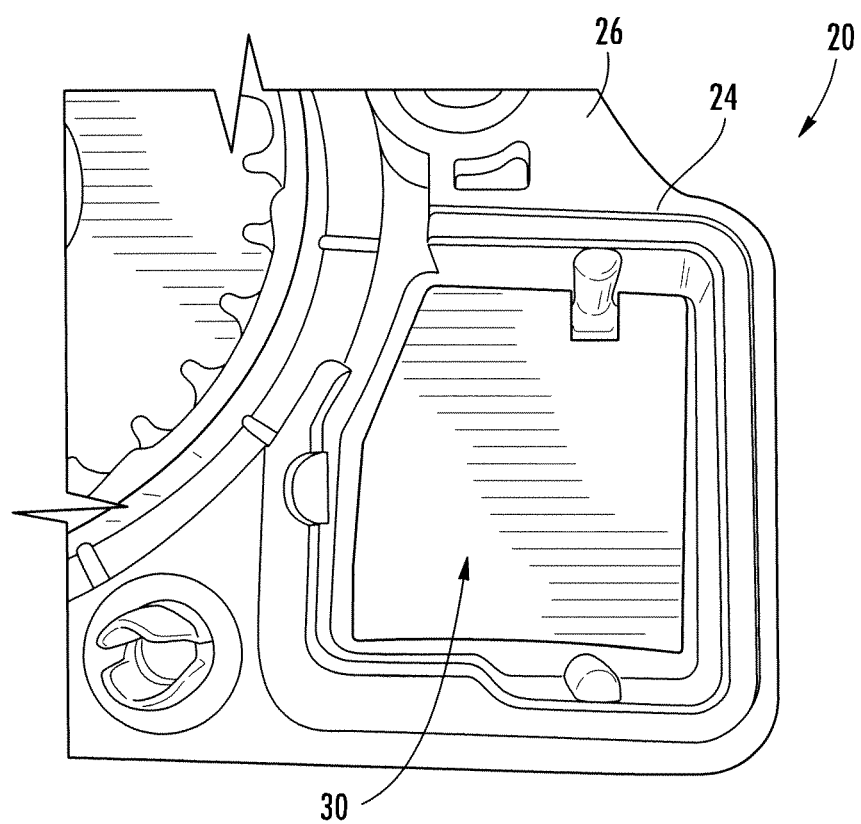
FIG. 2 is a side view of a portion of the cover for the retractor of FIG. 1 with a sound dampening feature.

FIG. 1 illustrates an exemplary embodiment of a seat belt system 10 for use in a vehicle 2 to help restrain the movement of an occupant 11 during a sudden acceleration, typically resulting from a dynamic impact event of the vehicle. The seat belt system 10 includes a webbing or belt 12, a buckle 14, a tongue member 16 slideably coupled to the webbing 12 and configured to selectively engage the buckle 14, an anchor member 18 configured to secure an end of the webbing 12, and a retractor 20. During normal vehicle use (i.e., when the vehicle does not experience a threshold acceleration), the retractor 20 may allow the webbing to be freely extracted and retracted from the retractor 20. During a dynamic impact event of the vehicle (i.e., resulting in a threshold vehicle acceleration), the retractor 20 is configured to lock the webbing 12 to prohibit extraction or unwinding to thereby restrict the movement of the occupant.

U.S. Patent Application Publication Number 2008/0203808 discloses seat belt systems configured to restrain secured occupants. The seat belt systems include a retractor having a spool configured to wind and unwind a seat belt webbing. The retractors may also include a planetary gear train for transmitting rotation of the spool to an operation member. U.S. Patent Application Publication Number 2008/0203808 is hereby incorporated by reference in its entirety. As explained and taught further below, retractors of the seat belt systems (e.g., the retractors of those seat belt systems disclosed in U.S. Patent Application Publication Number 2008/0203808) may be configured to include a sensing mechanism having a sensor configured to activate a locking member and a member (e.g., insert member) configured to reduce the noise of the retractor without impeding the performance of the locking of the retractor upon the threshold vehicle acceleration.

As shown, the seatbelt webbing 12 is connected to the retractor 20. For example, the retractor 20 may include a spool 23 that the webbing 12 is coupled to, such that upon rotation of the spool 23, the webbing 12 is extracted from or retracted into the retractor 20. The retractor 20 may also include a biasing member (not shown) that imparts a biasing force onto the spool 23 to retract the webbing 12. Thus, the retractor 20 may function to maintain the seatbelt webbing 12 in a loaded state (i.e., state of tension), but allows for additional seatbelt webbing 12 to be released or extracted, such as when an occupant enters a vehicle and puts on the seatbelt webbing 12. In addition to the spool and the biasing member, the retractor 20 may include various other mechanisms such as, for example, a locking mechanism, a pretensioner, and one or more sensing mechanisms having one or more sensors.

The sensing mechanism may include at least one sensor configured to detect a sudden change in the inertia of the vehicle, such as a vehicle acceleration. Each sensor may be configured to send a signal to a controller (not shown) for the retractor 20 to activate the retractor 20 as appropriate depending on whether the sensor detects a low or high acceleration event. In other words, the sensor may be configured to react to a threshold change in vehicle inertia or vehicle acceleration to change the retractor 20 from operating in a first free mode of operation, such as where the webbing 12 is allowed to be freely extracted from the retractor 20, to a second locked mode of operation, such as where the webbing 12 is prohibited from being extracted from the retractor 20.

Figure 3:
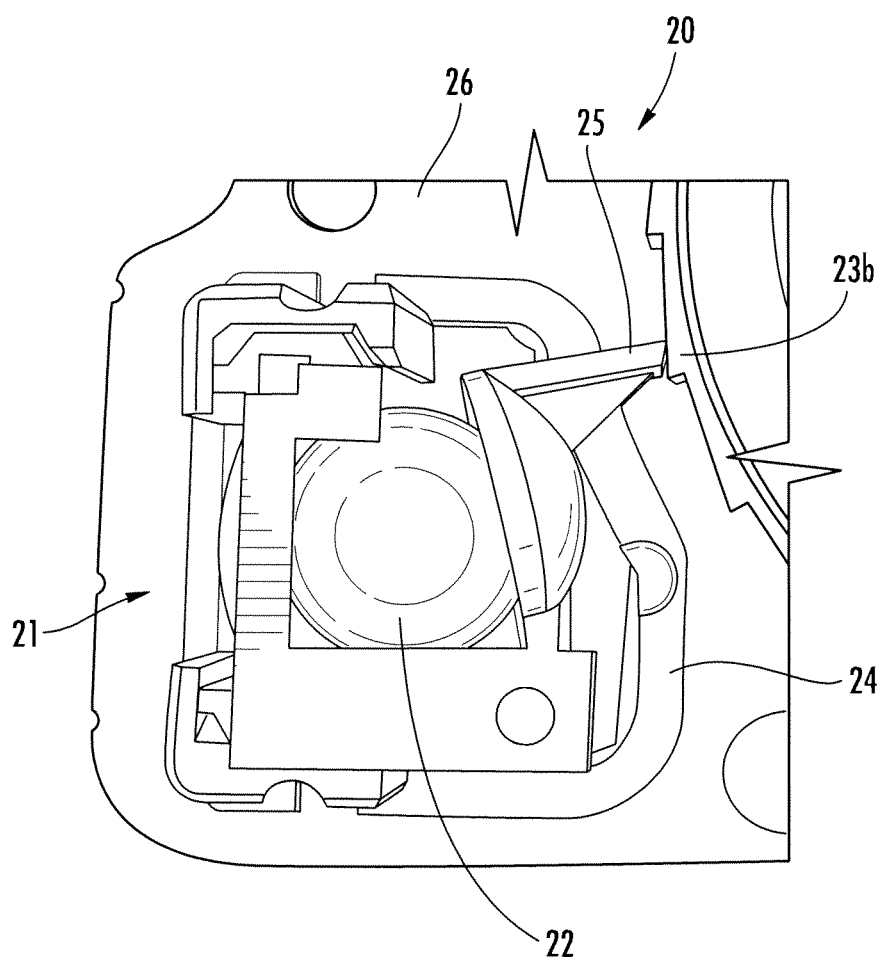
FIG. 3 is a side view of a portion of the retractor of FIG. 1, according to an exemplary embodiment.
Figure 4:
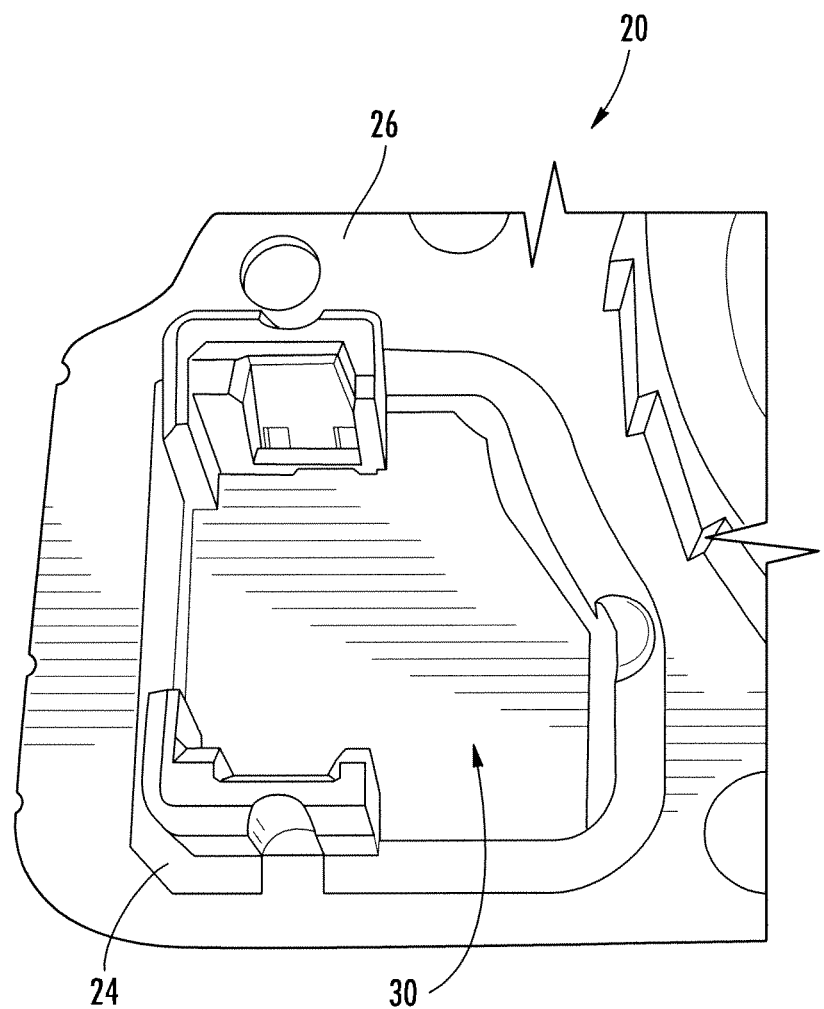
FIG. 4 is a side view of a portion of the retractor of FIG. 1 with a sensor mechanism removed to show a sound dampening feature, according to an exemplary embodiment.

As shown in FIG. 3, the sensing mechanism 21 is configured as a VS including a cover 24 (e.g., casing) which may be fixed to a housing 26 (e.g., a frame) of retractor (e.g., retractor 20), a sensor 22 disposed in the cover 24, and a locking member 25 (e.g., pawl). The sensor 22 may be configured to detect and react to a threshold change in the inertia of the vehicle, such as induced by a sudden change in the level of acceleration by the vehicle, whereby the sensor 22 may move and in turn move the locking member 25 a corresponding distance, such as to move the locking member 25 from a free position to a locked position relative to the spool 23. When in the free position, the locking member 25 may be separated from (e.g., disengaged from) the spool 23, such that the spool 23 may freely rotate in both the webbing extraction and retraction directions. When in the locked position, the locking member 25 engages the spool 23, such that the spool 23 may not rotate in at least the webbing extraction direction. In other words, the spool 23 of the retractor 20 may be allowed to rotate in only the webbing retraction direction when the locking member 25 is in the locked position, such as to allow the webbing 12 to be undergo a pretensioning by a pretensioner, but to prohibit extraction of the webbing 12 from the retractor 20 to thereby limit the travel or movement of the occupant. Accordingly, the locking member 25 may engage a gear 23b of the spool 23 through a ratcheting arrangement to allow rotation in only a single direction, when the locking member 25 is in the locked position.

The sensor 22 may be configured as an inertial sensor, which may be configured to move when subjected to a change in inertia of the vehicle, such as an inertia induced by a sudden vehicle acceleration that exceeds the threshold acceleration. The inertial sensor 22 may move to a position that activates the locking member 25, whereby the locking member 25 moves from the free position to the locked position. For example, the inertial sensor may be configured as a substantially spherical ball-type sensor. As another example, the inertial sensor may be configured as a standing man sensor having an irregular shaped mass that may rest on a member having a fulcrum in which the standing man sensor may tilt about during changes in vehicle inertia. The tilting of the standing man sensor drives actuation of the locking member to lock the retractor to prohibit the extraction of the webbing from the retractor.

Since these types of retractors rely on the movement of the sensor to provide sensing of the vehicle acceleration, a clearance generally exists between the sensing mechanism and one or more of the interior components of the retractor 20. For example, there may be a clearance provided between the sensor 22 of the sensing mechanism 21 and the cover 24 and/or the housing 26 of the retractor 20, such as to allow movement of the sensor 22 relative to the cover 24 and/or the housing 26. During operation of the retractor 20 and/or operation of the vehicle, the vehicle generally induces vibrations or oscillations that lead to noise (e.g., buzzing, rattling, etc.) being generated by the interior components of the retractor 20 contacting the housing of the retractor 20. Such noise may be objectionable to occupants of the vehicle.

FIGS. 2-6 illustrate exemplary embodiments of an insert 30 that is provided in the sensing mechanism 21 to reduce the noise level, such as to eliminate or greatly reduce the likelihood of objectionable noise from the retractor sensing mechanism 21. The insert 30 may be configured to dampen the noise generated by the interior components of the retractor 20 having clearances therebetween. For example, the insert 30 may be configured to dampen the noise generated by the sensor 22 contacting the cover 24 caused by vehicle vibrations.

According to an exemplary embodiment, the insert 30 is integrally formed with the cover 24. According to another exemplary embodiment, the insert 30 is integrally formed with the housing 26 of the retractor 20. For these embodiments, the insert 30 may be a second layer of a material that is formed on a first layer of a material of the cover 24 (or housing 26). For example, the cover 24 may be made out of a polypropylene (or any suitable material) formed during a first process, such as an injection molding process. Then, the cover 24 may have a second layer of insert material formed over the first layer of the polypropylene. For example, the second layer may be made from neoprene (or any suitable material, such as an elastomer). Thus, the second neoprene layer of the insert 30 may dampen the noise relative to the first polypropylene layer and the first layer may provide structure (e.g., strength) to the retractor 20. The first layer of material may be formed with vent holes to facilitate bonding or adhesion of the second layer when formed to the first layer.

Figure 5:
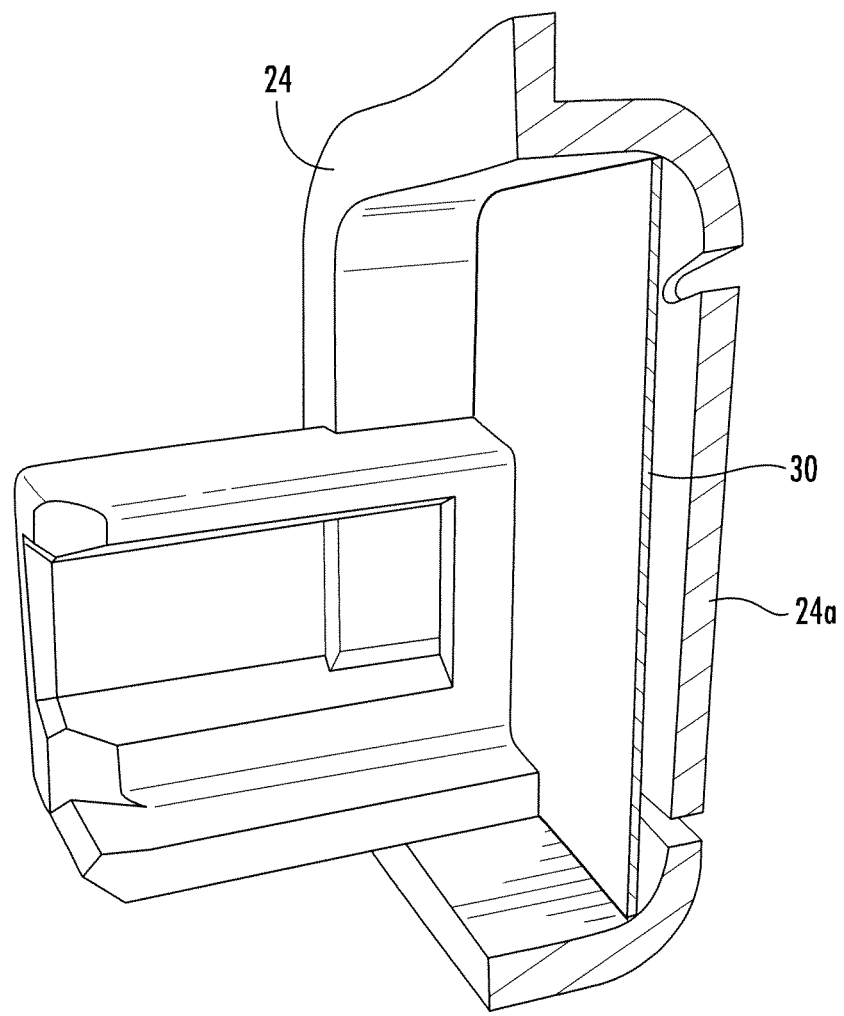
FIG. 5 is a cross-sectional view taken through the portion of the retractor of FIG. 4.
Figure 6:
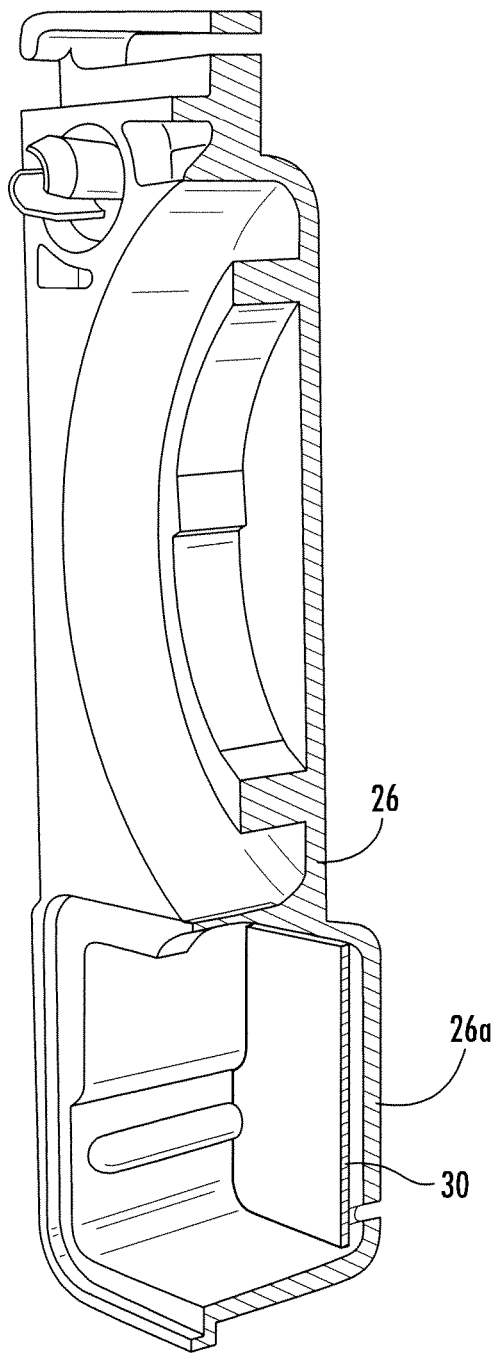
FIG. 6 is another cross-sectional view of another exemplary embodiment of a retractor.

Accordingly, the insert 30 may be disposed between an interior component, such as a sensor 22 of the sensing mechanism 21 and the cover 24 and/or the housing 26 of the retractor 20. The insert 30 may be provided in the cavity formed by the cover 24 and/or the housing 26. As shown in FIG. 5, the insert 30 may be spaced apart from a side wall 24a of the cover 24, such as to allow the insert 30 to deflect toward the side wall 24a. As shown in FIG. 6, the insert 30 may be spaced apart from a side wall 26a of the housing 26 of the retractor 20. It should be noted that the spaced apart distance between the insert 30 and the adjacent side wall may be different and may be tailored to the specific retractor. For example, the spacing distance may be driven by an amount of deflection that the insert 30 may undergo during operation of the retractor and/or vehicle.

According to an exemplary embodiment, the insert 30 is a separate component such as a sheet of a resilient material (e.g., rubber, a thermoplastic elastomer, etc.) that is configured to dampen the undesirable movement of the moving components. For example, the insert 30 may be made from neoprene and inserted into and retained by the cover 24. By being resilient, the insert 30 may advantageously be able to flex, such as when contacted by the sensor to reduce the likelihood of noise being generated, but not to impede performance of the sensor. The insert 30 may have a thickness that is large enough to provide sufficient dampening but thin enough to not interfere with the normal operation of the interior components of the retractor 20, such as to impede or retard the movement of the sensor 22 in the direction(s) to activate/deactivate the locking member 25. According to one exemplary embodiment, the insert 30 has a thickness of approximately 1 mm. For example, the insert 30 may be between 0.5 mm and 1.5 mm thick.

In one exemplary embodiment, the insert 30 may be held in place by the compression force between the interior components of the retractor 20 (e.g., a sensing mechanism 21) and the cover 24 and/or the housing 26. For example, the insert 30 may be compressed between the sensor 22 and the side wall (e.g., a portion of the cover 24, a portion of the housing 26). The compression between the sensor 22 and side wall may impart a force (e.g., a biasing force) into the sensor 22, where the force is in a first direction that is transverse to a second direction corresponding to the direction of movement of the sensor 22 when activating/deactivating the locking member 25 (i.e., to selectively lock the retractor 20 to prohibit extraction of the webbing 12).

In another exemplary embodiment, the insert 30 may be offset a distance from the sensor 22, where the insert 30 limits the travel of the retractor 20 in the direction transverse to the direction of movement of the sensor 22 when activating/deactivating the locking member 25. This arrangement reduces the noise by reducing the lateral movement of the sensor 22, while not impeding the performance (e.g., movement) of the sensor 22 when activating/deactivating the locking member 25.

In another exemplary embodiment, the insert 30 may have coupling features (e.g., bosses, barbs, snaps, etc.) that engage corresponding features on the interior component, the cover 24, or the housing 26. For example, the cover 24 may include channels that are configured to receive ends of the insert 30 to retain the insert 30 in place. As another example, the insert 30 may include an adhesive (e.g., an adhesive backing) that is configured to couple at least a portion of the insert 30 to a mating portion of another component of the retractor 20, such as to one or more extensions of the cover 24. In still another exemplary embodiment, the insert 30 may be integrally formed with a component of the retractor, such as with a two-shot injection molding process. The insert 30 may cover a relatively large area of the cover 24 or housing 26 or may be localized to only an area where interior components contact the cover 24 or housing 26, such as in the area local to the sensor.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat belt retractors as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A retractor for a seat belt system of a vehicle, comprising:
    a rotatable spool configured to be connected to a webbing wherein the webbing moves in an extraction direction and a retraction direction upon rotation of the spool;
    a frame configured to rotatably support the spool;
    a cover fixedly coupled to the frame and including a cavity therein;
    a locking member configured to selectively lock the spool and prevent the spool from rotating in the webbing extraction direction, wherein the locking member is configured to move between a free position and a locked position relative to the spool, wherein when the locking member is in the locked position, the spool is prohibited from rotating in the webbing extraction direction and when the locking member is in the free position, the spool is freely rotatable;
    a sensor located in the cavity and directly supported by the cover, wherein the sensor is configured to move in a first direction relative to the cover in response to the vehicle having a threshold acceleration, wherein the first direction is in a fore and aft direction of the vehicle, and wherein movement of the sensor in the first direction causes a corresponding movement of the locking member from the free position to the locked position; and
    an insert member that is disposed between the cover and the sensor to limit the travel of the sensor in a second direction that is transverse to the first direction,
    wherein the second direction is in a side to side direction of the vehicle,
    wherein the sensor consists of a single ball or a single standing man that is movable relative to the insert member, and
    wherein the insert member is in direct contact with the sensor.

2. The retractor of claim 1, wherein at least a portion of the insert member is fixedly coupled to the cover such that the sensor moves relative to the cover, the frame, and the insert member.

3. The retractor of claim 2, wherein the insert member that is in direct contact with the sensor applies a biasing force to the sensor, and wherein the biasing force is imparted into the insert member in the second direction.

4. The retractor of claim 3, wherein the insert member is made of a resilient material that induces the biasing force upon compression of the insert member.

5. The retractor of claim 4, wherein the resilient material is a rubber or a thermoplastic elastomer.

6. The refractor of claim 1, wherein the insert member is offset a distance from a wall of the cover.

7. The refractor of claim 1, wherein the insert member has a thickness of 0.5-1.5 mm.

8. The retractor of claim 2, wherein the at least a portion of the insert member fixedly coupled to the cover includes an edge of the insert member.

9. A seat belt system for a vehicle for restraining a secured occupant, the seat belt system comprising:
    a webbing having a first end and a second end;
    an anchor configured to secure the first end of the webbing;
    a tongue member slideably coupled to the webbing and configured to selectively engage a buckle mechanism; and
    a retractor including:
        a rotatable spool configured to be connected to the second end of the webbing wherein the webbing moves in an extraction direction and a retraction direction upon rotation of the spool;
        a frame configured to rotatably support the spool;
        a cover fixedly coupled to the frame and including a cavity therein;
        a locking member configured to selectively lock the spool and prevent the spool from rotating in the webbing extraction direction, wherein the locking member is configured to move between a free position and a locked position relative to the spool, wherein when the locking member is in the locked position, the spool is prohibited from rotating in the webbing extraction direction and when the locking member is in the free position, the spool is freely rotatable;
        a sensor disposed in the cavity and directly supported by a first portion of the cover, wherein the sensor is configured to move in a first direction relative to the cover in response to the vehicle having a threshold acceleration and wherein movement of the sensor in the first direction causes a corresponding movement of the locking member from the free position to the locked position; and
        an insert member that is disposed between a second portion of the cover and the sensor to limit the travel of the sensor in a second direction that is transverse to the first direction,
    wherein the first direction is in a fore and aft direction of the vehicle and the second direction is in a side to side direction of the vehicle,
    wherein the sensor consists of a single ball or a single standing man that is movable relative to the insert member, and
    wherein the insert member is in direct contact with the sensor.

10. The sensing mechanism of claim 9, wherein the insert member that is in direct contact with the sensor applies a biasing force to the sensor.

11. The sensing mechanism of claim 10, wherein the biasing force is imparted into the insert member in the second direction.

12. The sensing mechanism of claim 11, wherein the insert member is made of a resilient material that induces the biasing force upon compression of the insert member.

13. The sensing mechanism of claim 12, wherein the resilient material is a rubber or a thermoplastic elastomer.

14. The sensing mechanism of claim 9, wherein the insert member is offset a distance from a wall of the cover.

15. The sensing mechanism of claim 9, wherein the insert member has a thickness of 0.5-1.5 mm.

16. The sensing mechanism of claim 9, wherein the sensing mechanism includes a coupling feature to attach the insert member to the cover.

17. The retractor of claim 8, wherein an adhesive is used to couple the edge of the insert member to an extension of the cover.

18. The retractor of claim 9, wherein at least a portion of the insert member is fixedly coupled to the cover, such that the sensor moves relative to the cover, the frame, and the insert member.

19. A retractor for a seat belt system of a vehicle, comprising:
- a rotatable spool configured to be connected to a webbing wherein the webbing moves in an extraction direction and a retraction direction upon rotation of the spool;
- a frame configured to rotatably support the spool;
- a locking member configured to selectively lock the spool and prevent the spool from rotating in the webbing extraction direction, wherein the locking member is configured to move between a free position and a locked position relative to the spool, wherein when the locking member is in the locked position, the spool is prohibited from rotating in the webbing extraction direction and when the locking member is in the free position, the spool is freely rotatable;
- a sensor consisting of a single ball or a single standing man configured to move in a first direction relative to the frame from a free position to a locking position in response to the vehicle having a threshold acceleration, wherein movement of the sensor in the first direction causes a corresponding movement of the locking member from the free position to the locked position; and
- a cover fixedly coupled to the frame and defining a cavity for housing the sensor, wherein the cover includes an outer layer of structural material and an inner layer of elastomeric material formed over the outer layer, and wherein the sensor contacts the inner layer in a lateral direction, which is transverse to the first direction, when in the free position to prevent movement of the sensor in the lateral direction and to dampen a noise of contact between the sensor and the cover.

* * * * *